July 6, 1965    C. R. HATCHER    3,193,687
NONLINEAR ELECTRO-OPTICAL SYSTEM
Filed May 4, 1962    3 Sheets-Sheet 1
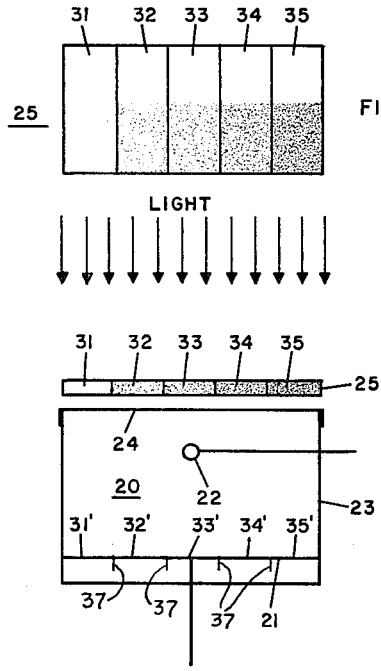
FIG. 1
FIG. 2
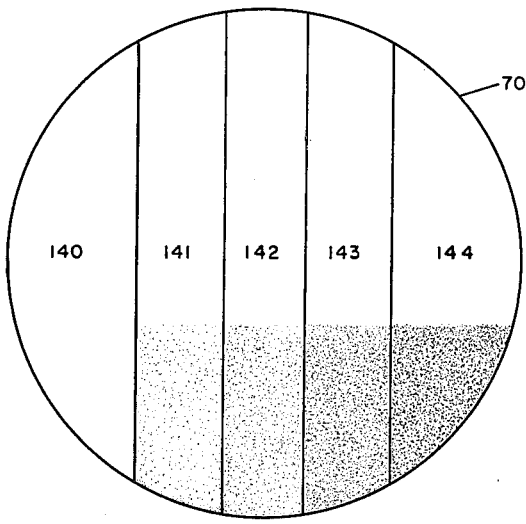
FIG. 3B
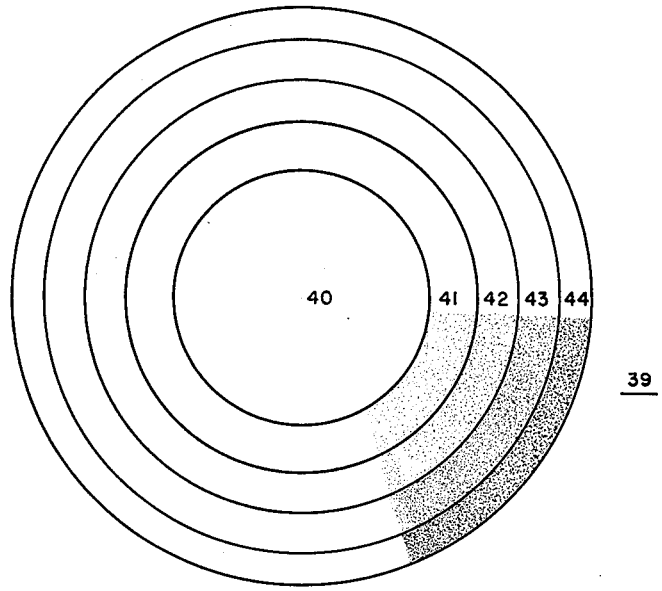
FIG. 3A
INVENTOR.
CHARLES R. HATCHER
BY
ATTORNEYS July 6, 1965
C. R. HATCHER
3,193,687
NONLINEAR ELECTRO-OPTICAL SYSTEM
Filed May 4, 1962
3 Sheets-Sheet 2
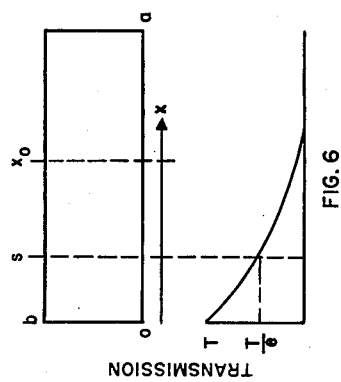
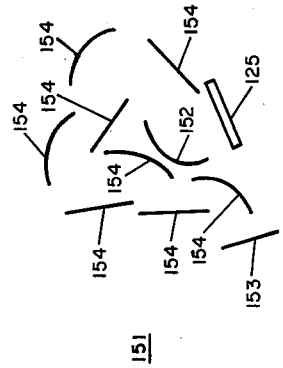
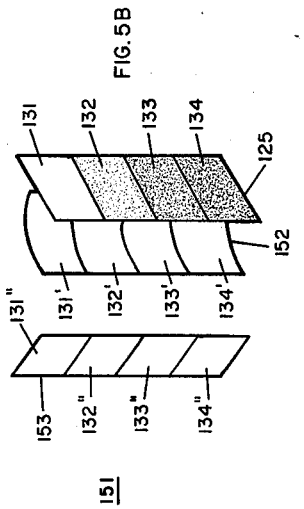
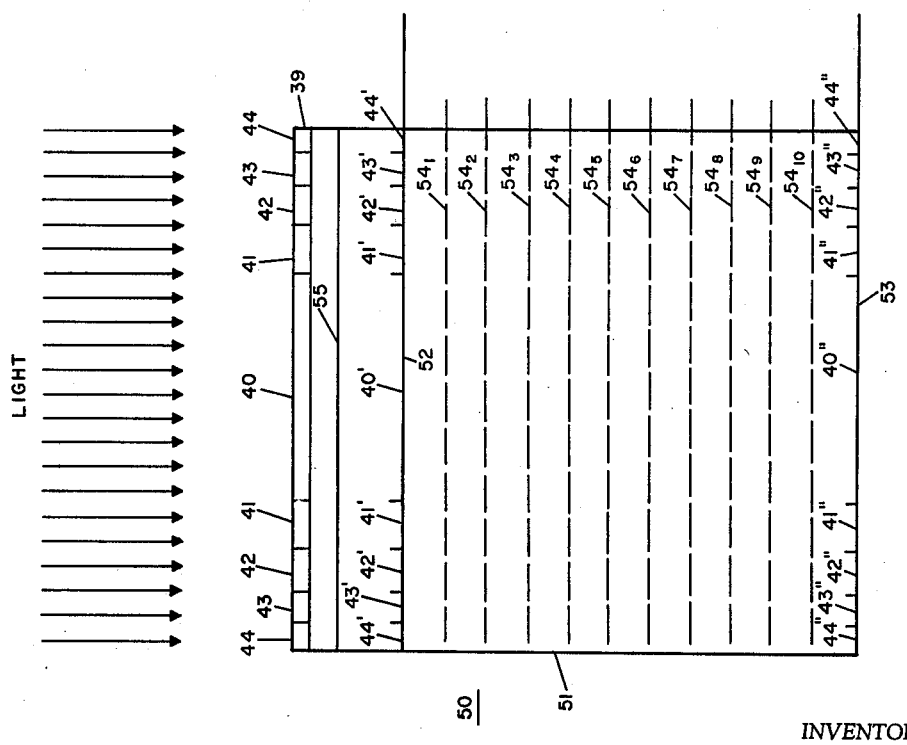
INVENTOR.
CHARLES R. HATCHER
BY
ATTORNEYS

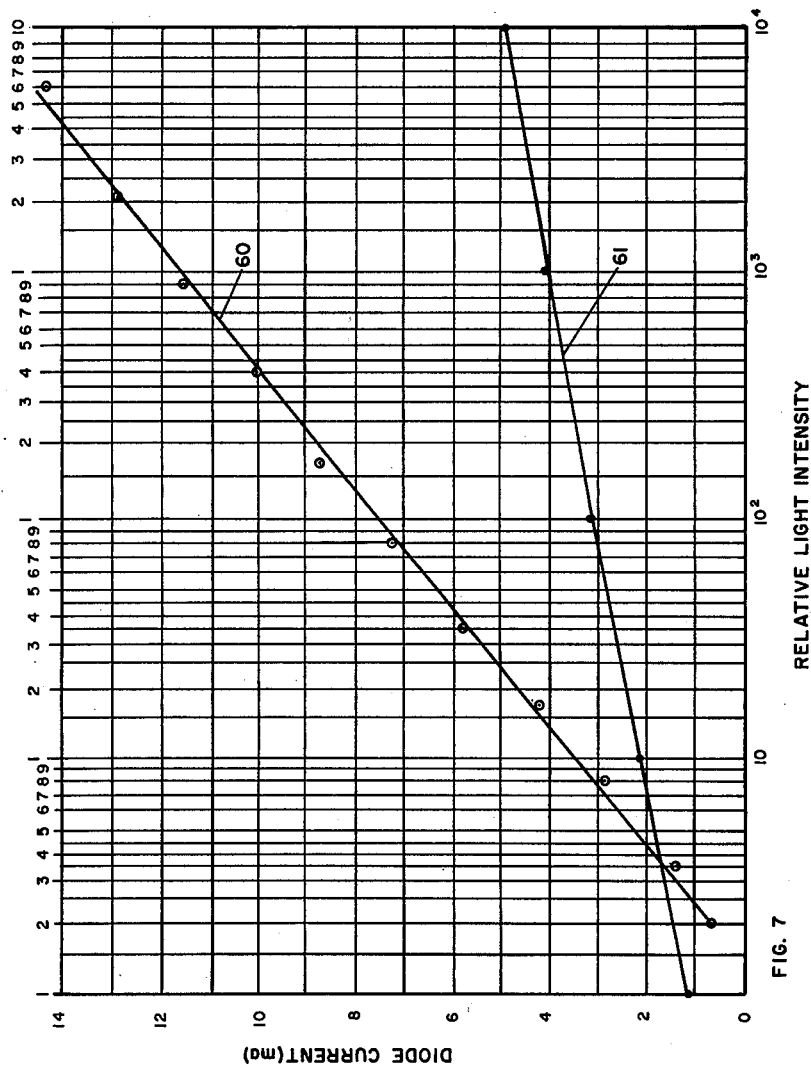

United States Patent Office 3,193,687
Patented July 6, 1965

3,193,687
NONLINEAR ELECTRO-OPTICAL SYSTEM
Charles R. Hatcher, Santa Barbara, Calif., assignor to Edgerton, Germeshausen & Grier, Inc., Boston, Mass., a corporation of Massachusetts
Filed May 4, 1962, Ser. No. 192,535
20 Claims. (Cl. 250—216)

This invention relates generally to nonlinear electro-optical systems adapted to convert optical input into electrical output which is nonlinearly related to said input. More specifically, this invention relates to an electro-optical system adapted to convert light input into an electrical output logarithmically related to said light input.

In many types of detecting and measuring systems which utilize photodiodes or photomultiplier tubes, it is exceedingly desirable to convert from a linear light input to a logarithmic, or a nonlinear, electrical output, in order to record a wider dynamic range of light intensity. Moreover, under certain circumstances, photodiodes or photomultiplier tubes may become saturated by the extreme high intensity of the light input. Their output currents are not then functionally related to the intensity of the light input. Accordingly, it is desirable that conversion means to obtain a nonlinear output be operative before full saturation occurs.

Means heretofore utilized to obtain the nonlinear output of the present invention include nonlinear output circuits for such photodiodes, or photomultiplier tubes. For example, a logarithmic output circuit for use with a photomultiplier tube is disclosed in U.S. Letters Patent No. 2,454,871, issued to Norman R. Gunderson on November 30, 1948.

Generally speaking, this invention contemplates the use of a photosensitive device which has a current versus light characteristic that permits current saturation above a certain light intensity, and a nonuniform optical filter responsive to the intensity of the light input, the combination of which causes the modification of the net electric output of said photosensitive device to be nonlinearly related to the light input.

The preferred forms of this invention employ a nonuniform optical filter which in the examples illustrated and described herein may be rectangular in shape or circular in shape. Each such filter may have a plurality of areas of different densities, or the density of the filter may increase uniformly or nonuniformly from zero to some high density. Thus, for example, the circular filter may have a center circle of zero density, a first adjacent annulus having a density that transmits a fraction of light incident thereon, a second annulus adjacent to said first annulus having a density that transmits a smaller fraction of incident light, a third annulus having a density that transmits an even smaller fraction of incident light, and further such annuli. The image of the filter need not be focused precisely on the photocathode of the photodiode or photomultiplier tube, since some parallax may be desired to avoid sharp steps in output. If a photosensitive device that can be driven to current saturation by incident light is utilized in combination with such filter, the output will be nonlinear with respect to the intensity of the input light.

With the above points in mind, it is an object of the invention to provide a nonlinear electro-optical system adapted to produce an electric output signal which is a nonlinear function of a light input signal.

It is a further object of this invention to provide a nonlinear electro-optical system adapted to produce an electric output signal which is a virtually logarithmic function of a light input signal.

Other and allied objects will become apparent to those skilled in the art upon a careful perusal of the specification, the appended claims, and illustrations of which:

FIGURE 1 is an illustrative schematic diagram of the system of the present invention in which a photodiode is utilized;

FIGURE 2 is a plan view of a nonuniform rectangular-shaped optical filter;

FIGURE 3A is a plan view of a nonuniform circular optical filter;

FIGURE 3B is a plan view of another type of nonuniform circular optical filter;

FIGURE 4 is an illustrative schematic diagram of the system of the present invention utilizing a "Venetian blind" type of photomultiplier tube;

FIGURES 5A and 5B are illustrative schematic diagrams of the system of the present invention utilizing a "squirrel cage" type of photomultiplier tube;

FIGURE 6 is a graph useful in explaining the mathematical derivation proving that the output electric signal is logarithmically related to the input light; and FIGURE 7 presents graphs of certain output currents versus light intensities.

Illustrated in FIGURE 1 is a photodiode 20 which comprises an envelope 23 containing a planar photocathode 21, a photoanode 22, and a window 24. Disposed adjacent to window 24 is nonlinear filter 25. It is to be understood that planar photocathode 21 may be driven to saturation by sufficient light intensity; that is, that photodiode 20 has a current versus light characteristic that permits current saturation above a certain light intensity. Nonlinear filter 25 is illustrated as having five areas 31, 32, 33, 34 and 35 of varying densities. For purposes of explanation, tick marks 37 are illustrated as dividing photocathode 21 into corresponding areas 31', 32', 33', 34' and 35'. It is to be understood that the image of filter 25 is projected on photocathode 21. Assume that area 31 of filter 25 transmits all light incident thereon; that area 32 transmits $1/10$ of the light incident thereon; that area 33 transmits $1/100$ of the light incident thereon; that area 34 transmits $1/1000$ of the light incident thereon; and that area 35 transmits $1/10000$ of the light incident thereon. Further assume that light having a uniform intensity I impinges upon filter 25, and that said light passing through area 31 impinges upon area 31' of photocathode 21 driving it just to saturation, producing a current of 1 milliampere. If filter 25 were omitted, the total current produced by said light would be 5 milliamperes. The different densities of the areas of filter 25, however, change this result as illustrated in Table A below:

Table A

| Filter Area | Intensity of Light Transmitted | Corresponding Photocathode Area | Current Produced, ma. |
|---|---|---|---|
| 31 | I | 31' | 1.0 |
| 32 | 0.1 I | 32' | 0.1 |
| 33 | 0.01 I | 33' | 0.01 |
| 34 | 0.001 I | 34' | 0.001 |
| 35 | 0.0001 I | 35' | 0.0001 |
| Total Current Output of Photodiode | | | 1.1111 |

As stated above, area 31' of photocathode 21 produces a current of 1 milliampere. The intensity of the light impinging upon area 32', however, has been reduced by a factor of ten to 0.1 I. Therefore, the current produced by area 32' is 0.1 milliampere. Similarly, as indicated in Table A above, areas 33′, 34′ and 35′ produce correspondingly reduced currents. Note that the total current output of photodiode 20 is 1.1111 milliamperes.

The currents produced for various light imputs are tabulated in Table B below:

*Table B*

| Relative light intensity: | Current produced, ma. |
| --- | --- |
| I | 1.1111 |
| 10 I | 2.111 |
| 100 I | 3.11 |
| 1,000 I | 4.1 |
| 10,000 I | 5.0 |

These data are plotted in FIGURE 7 as curve 61. Note that the relationship between output current and light intensity is nonlinear, being virtually logarithmic.

In the foregoing, for purposes of illustration, specific densities were assumed for areas 31, 32, 33, 34, and 35 of filter 25. It will be apparent to those skilled in the art that different densities could be used and that a greater number of areas of varying densities could be used or the density could be uniformly increased from zero to some desired value. For example, instead of five areas of varying densities, fifteen areas of varying densities, covering a smaller density range, might be used. Thus, different nonlinear relationships between the current output of photodiode 20 and the input light intensity could be obtained. Moreover, it is possible to select areas and densities such that the output will be logarithmic with respect to the input.

In the examples described herein, the areas of the different filter densities have been made equal for simplicity of explanation. When a particular set of requirements are known, it is possible that these areas may be varied as well as the range of filter densities for the areas. Thus, almost any nonlinear relationship required may be obtained.

In FIGURES 1 and 2, it was assumed that the photodiode was rectangular in shape. In certain cases, however, the photodiodes are cylindrical in shape. In such event, a circular nonuniform filter may be used, such as is illustrated in FIGURE 3A. Here, inner area 40 may transmit all incident light and have a radius of, for example, one centimeter. Adjacent to inner circle 40 is annulus 41 which may transmit a fraction of light incident thereupon. The area of annulus 41 may be made equal to the area of circle 40, in which event its outer radius will be 1.4142 centimeters. Next annulus 42 may transmit a smaller fraction of light incident thereupon. If all areas are to be equal, its radius will be 1.7321 centimeters. Similarly annuli 43 and 44 have radii of 2 and 2.2361 centimeters respectively and will transmit smaller fractions of light incident thereupon. When filter 39 of FIGURE 3A is used with a photodiode or a photomultiplier tube which has a current versus light characteristic that permits current saturation above a certain light intensity, results similar to those tabulated in Tables A and B will be obtained.

As will be explained hereinafter, it may be desirable to use the circular nonuniform filter 70 illustrated in FIGURE 3B. Here, all density areas are equal. Area 140 may transmit all incident light; area 141 a fraction of the light incident thereupon; area 142 may transmit even a smaller fraction of light; and so on for areas 143 and 144.

It will now be demonstrated that a photodiode having a planar photocathode can be made to respond logarithmically to light intensity in combination with a filter 25 similar to that illustrated in FIGURE 2. If the image of filter 25 is not quite focused on the photocathode, the sensitivity of the photocathode is uniform, and the electric field between the electrodes is uniform, the photodiode output current can be made to be a logarithmic function of the light intensity. Using the case of rectangular photocathode 25 (see FIGURE 2), for simplicity, the following terms are defined:

$J(L,x)$ = current density, amp/cm.$^2$;
$J_0$ = saturation current density;
$L$ = light intensity, erg/cm.$^2$ sec.;
$x$ = distance across filter, cm. (see FIGURE 6);
$C$ = photocathode sensitivity, coul./erg;
$s$ = attenuation coefficient of filter, cm. (see FIGURE 6);
$a,b$ = dimensions of filter, cm. (see FIGURE 6);
$e^{-x/s}$ = transmission of filter at $x$ (see FIGURE 6);
$I(L)$ = current from photodiode, amp.

Assume that the saturation characteristics of the photodiode are sharp; that is, for $x < x_0$ (see FIGURE 6) there is complete space charge saturation and for $x > x_0$ the photocathode responds linearly to the light intensity. Then, $$I(L) = \int_0^a bJ(L,x)\,dx \qquad (1)$$

$$= \int_0^{x_0} bJ_0\,dx + \int_{x_0}^a bCL\,e^{-x/s}\,dx \qquad (2)$$

$$= bJ_0x_0 + bsCL[e^{-x_0/s} - e^{-a/s}] \qquad (3)$$

But $$J_0 = CL\,e^{-x_0/s} \qquad (4)$$

and $$J(L,a) = CL\,e^{-a/s} \qquad (5)$$

below complete saturation. Thus, $$I(L) = bJ_0x_0 + bsJ_0 - bsJ(L,a) \qquad (6)$$

$$= bsJ_0\left[1 - \frac{J(L,a)}{J_0} + \log_e\frac{CL}{J_0}\right] \qquad (7)$$

Over the logarithmic range, $J(L,a) \ll J_0$, so that $$I(L) \cong bsJ_0\left[1 + \log_e\frac{CL}{J_0}\right] \qquad (8)$$

Thus the change in current per factor of $e$ change in light level is given by $$bsJ_0 = \Delta I \qquad (9)$$

per generation. The response of the photodiode below the logarithmic range can be expressed from Equation 2 by $$I(L) = \int_0^a bCL\,e^{-x/s}\,dx \qquad (10)$$

$$= bsCL[1 - e^{-a/s}] \cong bsCL \qquad (11)$$

The current at which the photodiode becomes logarithmic can be found by replacing $CL$ by $J_0$. Thus, $$I_{\min\,\log} = bsJ_0[1 - e^{-a/s}] \cong bsJ_0 \qquad (12)$$

The ratio of the diode sensitivity (in the linear region) with and without filter is given by $$\frac{I(L)}{abCL} = \frac{s}{a}[1 - e^{-a/s}] \cong \frac{s}{a} \qquad (13)$$

For a maximum filter attenuation of $10^4$, $s/a \cong 0.11$.

A circular filter similar to that illustrated in FIGURE 3A, but having fourteen density areas and a neutral density range of 0 to 3.5, was made. The filter was designed to have a neutral density of zero in the center and to have each density area cover an equal photocathode area. Output curve 60 of a photodiode using this filter is shown in FIGURE 7. Note that the diode current is a linear function of the logarithm of the light intensity over the range covered. Such circular filters may be made by exposing film under an enlarger while masking off progressively larger concentric circular areas. Graduated rings may be machined for this purpose.

It has been found that if the density steps of such a filter are small, they are not observed in the output of the photodiode.

A filter 39 used in conjunction with a Venetian blind type of photomultiplier tube 50 is illustrated in FIGURE 4. Photomultiplier tube 50 has a cylindrical envelope 51 containing a photocathode 52, a photoanode 53, and a plurality of dynodes 54 disposed in the so-called Venetian blind arrangement. Generally speaking, said dynodes 54 are provided with progressively higher electric potentials with respect to the photocathode by means of a voltage divider or tap resistor (not shown) connected across said dynodes, said resistor or divider being connected to a source of voltage supply. A window is shown at 55 through which light may be directed to impinge upon photocathode 52. A circular filter 39 such as is illustrated in FIGURE 3A is shown adjacent window 55 and is so spaced as to be projected on photocathode 52. Density areas 40, 41, 42, 43, and 44 of filter 39 are shown having corresponding areas 40′, 41′, 42′, 43′, and 44′ on photocathode 52 and corresponding areas 40″, 41″, 42″, 43″, and 44″ on photoanode 53.

As in the example discussed in connection with FIGURES 1 and 2, it will be assumed that light having an intensity I impinges upon filter 39. However, if filter 39 were omitted, said light would impinge on photocathode 52 through window 55 producing electrons that would be multiplied and collected at photoanode 53. It will be further assumed in this event that the current developed at photoanode 53 is the current at the saturation point of photomultiplier tube 50. Thus, as in the previous example, it will be assumed that light with intensity I would produce a current equal to 5 milliamperes (filter 39 being omitted). With filter 39 in the position illustrated, it will be assumed that the current developed at area 40″ of photoanode 53 would be 1 milliampere. Similarly, the current developed at area 41″ of photoanode 53, after multiplication, would be 0.1 milliampere. Likewise smaller currents would be produced at the other areas of photoanode 53 corresponding to the other density areas of filter 39. Accordingly, results similar to the results shown in Tables A and B can be obtained with the embodiment of FIGURE 4. Currents produced at photocathode 52 are multiplied by succeeding dynodes $54_1$ through $54_{10}$ and are collected at photoanode 53. Moreover, to assure current saturation at photoanode 53, the successive differences in potential between dynodes 54 and photoanode 53 may be made successively smaller.

Likewise, the remarks pertaining to variations in areas and densities following the description of FIGURES 1 and 2 are equally applicable to the embodiment illustrated in FIGURE 4. Thus, the density areas of filter 39 may be increased in number and may be varied. Likewise, the density steps may be made very much smaller and cover a shorter or longer range as desired. Accordingly, the output electrical signal may be made to vary nonlinearly in accordance with any desired function that has a nonlinear characteristic with respect to the intensity of the input light.

It will be apparent to those skilled in the art that the squirrel cage type of photomultiplier tube can be similarly operated. Thus, a nonuniform filter 125 (similar to filter 25 in FIGURE 2) may be disposed between a light source (not shown) and photocathode 152 of squirrel cage photomultiplier tube 151, as illustrated in FIGURES 5A and 5B.

Again, it will be assumed that light having an intensity I impinges upon filter 125. It will be further assumed that photoanode 153 would be just saturated if filter 125 were omitted and would deliver 4 milliamperes current over equal areas 131″, 132″, 133″ and 134″, which correspond to areas 131′, 132′, 133′ and 134′ of photocathode 152 and to equal areas 131, 132, 133 and 134 of filter 125 having neutral densities of 0, 1, 2 and 3. Again, the output currents for various light intensities would vary in the manner discussed heretofore. It will, therefore, be apparent, that the combination may be made to yield a current characteristic that is nonlinear with respect to the range of light intensities impinging thereon.

Obviously the variable-density filters discussed above may be substituted for window 24 of FIGURE 1, or window 55 of FIGURE 4, or the window of a squirrel cage type of photomultiplier tube, or for the window of any photosensitive device having an electrode with a light-current saturation characteristic, to obtain the results of the present invention.

In the foregoing description only light impinging normally on the filter and photosensitive electrode has been considered to simplify the explanation. It remains to consider light that does not impinge normally. Some of this light will directly activate the photosensitive electrode as does light impinging normally thereupon with like results. The remainder of such light will be reflected from said electrode back to the window of the photosensitive device. There a portion will be reflected back to the electrode and a portion will be transmitted therethrough to the filter. Again, at the filter a portion will be transmitted and a portion will be reflected. Assume that each reflecting surface reflects a fraction of such light, which fraction is constant over the entire surface. It will be obvious to those skilled in the art that a single non-normal light ray will be attenuated non-linearly as it passes back and forth between the photosensitive electrode and such other reflecting surfaces. Accordingly, light that does not impinge normally on the photosensitive electrode will be attenuated non-linearly as it is reflected back and forth between the photosensitive electrode and such reflecting surfaces. The overall effect of this is a non-linear current output from such light.

Although for purposes of explanation, a small number of density areas, a relatively large range of densities, and a more or less theoretical light intensity have been used, it will be apparent to those skilled in the art that various combinations of density areas, density ranges and density steps may be utilized to meet particular requirements. All such are considered to lie within the true spirit and scope of the invention as hereinafter defined in the appended claims.

What is claimed is:

1. A nonlinear electro-optical system that comprises:
    a photosensitive device having an electrode that normally would be driven to current saturation by light impinging upon the active area of said device, said light having a range of intensities above the maximum intensity that will not drive said electrode to current saturation; and
    an optical filter interposed between said impinging light and said active area, said optical filter having a density increasing from a first density that will permit current saturation of a corresponding part of said electrode by said light to higher densities that will permit parts of said electrode to respond to said light without being current saturated.

2. A nonlinear electro-optical system as in claim 1 in which said density of said optical filter increases uniformly from said first density to said higher densities.

3. A nonlinear electro-optical system as in claim 1 in which said density of said optical filter increases by steps from said first density to said higher densities.

4. A nonlinear electro-optical system as in claim 1 in which said photosensitive device is a photodiode.

5. A nonlinear electro-optical system as in claim 1 in which said photosensitive device is a photomultiplier tube.

6. A nonlinear electro-optical system as in claim 5 in which said photomultiplier tube is of the squirrel cage type.

7. A nonlinear electro-optical system as in claim 5 in which said photomultiplier tube is of the Venetian blind type.

8. A nonlinear electro-optical system as in claim 1 in which the increase in density of said filter is adapted to produce an output current characteristic from said photosensitive device that varies logarithmically with respect to the range of intensities of said impinging light.

9. A nonlinear electro-optical system as in claim 1 in which said filter is circular and comprises:
a circular area of zero density; and
a series of equal annular shaped areas adjacent thereto having increasing density steps.

10. A nonlinear electro-optical system as in claim 9 in which said increasing density steps each decrease the intensity of the light transmitted to one-tenth of that transmitted by the preceding density step.

11. A nonlinear photosensitive device comprising:
an active area;
an electrode that normally would be driven to current saturation by light impinging upon said active area, said light having a range of intensities above the maximum intensity that will not drive said electrode to saturation; and
a window having a density increasing from a first density that will permit current saturation of a corresponding part of said electrode by said light to higher densities that will permit parts of said electrode to respond to said light without being current saturated.

12. A nonlinear photosensitive device as in claim 11 in which said density of said window increases uniformly from said first density to said higher densities.

13. A nonlinear photosensitive device as in claim 11 in which said density of said window increases by steps from said first density to said higher densities.

14. A nonlinear photosensitive device as in claim 13 in which said density steps each decrease the intensity of the light transmitted to one-tenth of that transmitted by the preceding density step.

15. A nonlinear photosensitive device as in claim 11 in which the increase of density of said window is adapted to produce an output current characteristic of said device that varies logarithmically with respect to the range of intensities of said impinging light.

16. A nonlinear photosensitive device as in claim 11 in which said window is circular and has
a circular area of zero density; and
a series of equal annular shaped areas adjacent thereto having increasing density steps.

17. A nonlinear photosensitive device comprising:
an electrode that normally would be driven to current saturation by light impinging thereupon, said light having a range of intensities above the maximum intensity that will not drive said electrode to saturation; and
a window having a density increasing from a first density that will permit current saturation of a corresponding part of said electrode by said light to higher densities that will permit parts of said electrode to respond to said light without being current saturated.

18. A nonlinear photosensitive device as in claim 17 in which said density of said window increases by steps from said first density to said higher densities.

19. A nonlinear photosensitive device as in claim 18 in which said density steps each decrease the intensity of the light transmitted to one-tenth of that transmitted by the preceding density step.

20. A nonlinear photosensitive device as in claim 17 in which said window is circular and has
a circular area of zero density; and
a series of equal annular shaped areas adjacent thereto having increasing density steps.

References Cited by the Examiner

UNITED STATES PATENTS

| | | | |
|---|---|---|---|
| 2,207,411 | 7/40 | Pierce | 88—111 X |
| 2,474,828 | 7/49 | Connelly et al. | 88—108 X |
| 2,700,318 | 1/55 | Snyder | 88—108 X |
| 2,806,405 | 9/57 | Amand | 250—229 X |

RALPH G. NILSON, *Primary Examiner.*
WALTER STOLWEIN, *Examiner.*